Dec. 15, 1959 H. G. AXTMANN 2,917,319
PLURAL COMPARTMENT FLUID SUSPENSION FOR VEHICLES
Filed Nov. 19, 1956 3 Sheets-Sheet 2
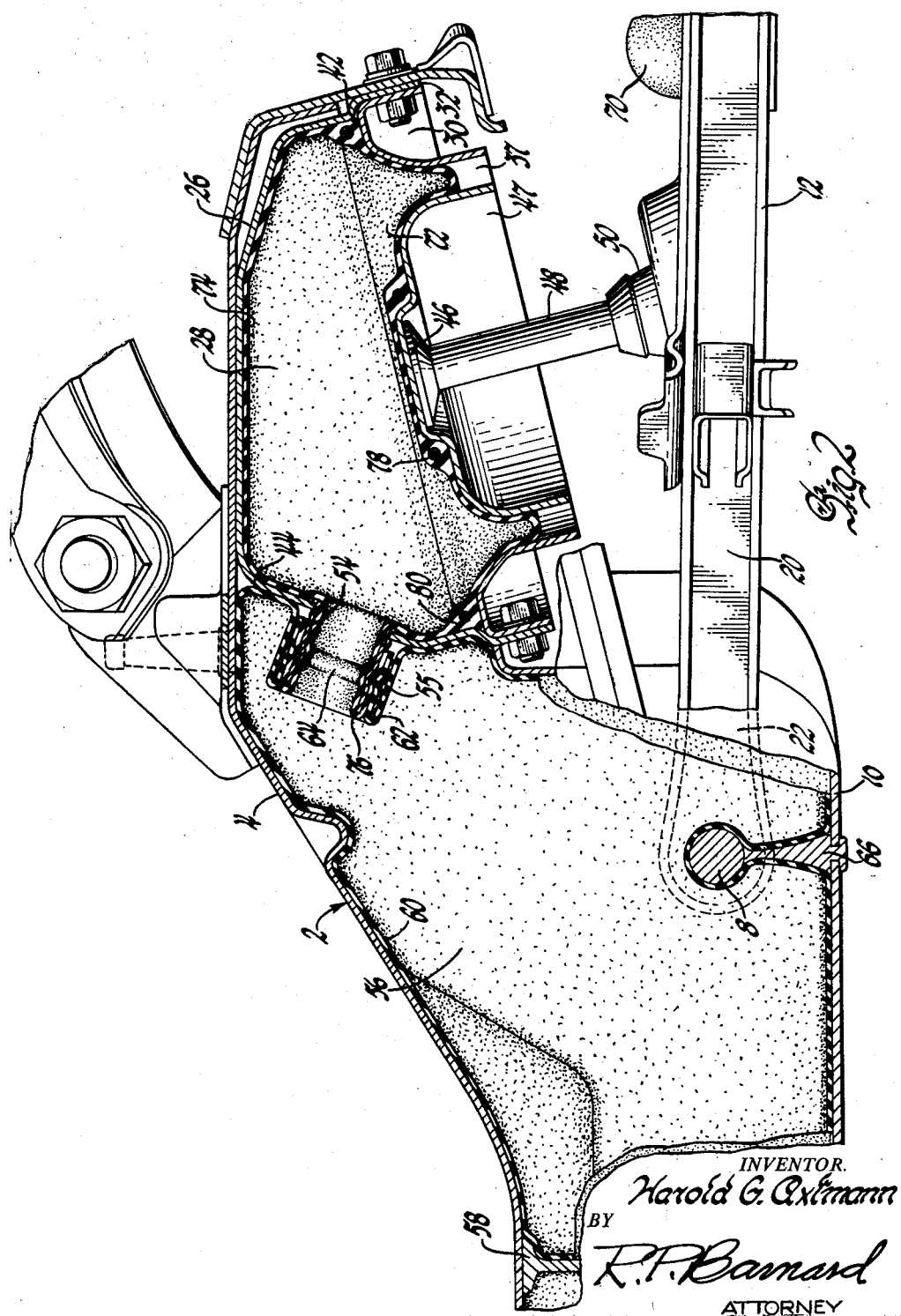
INVENTOR.
Harold G. Axtmann
BY
R. P. Barnard
ATTORNEY

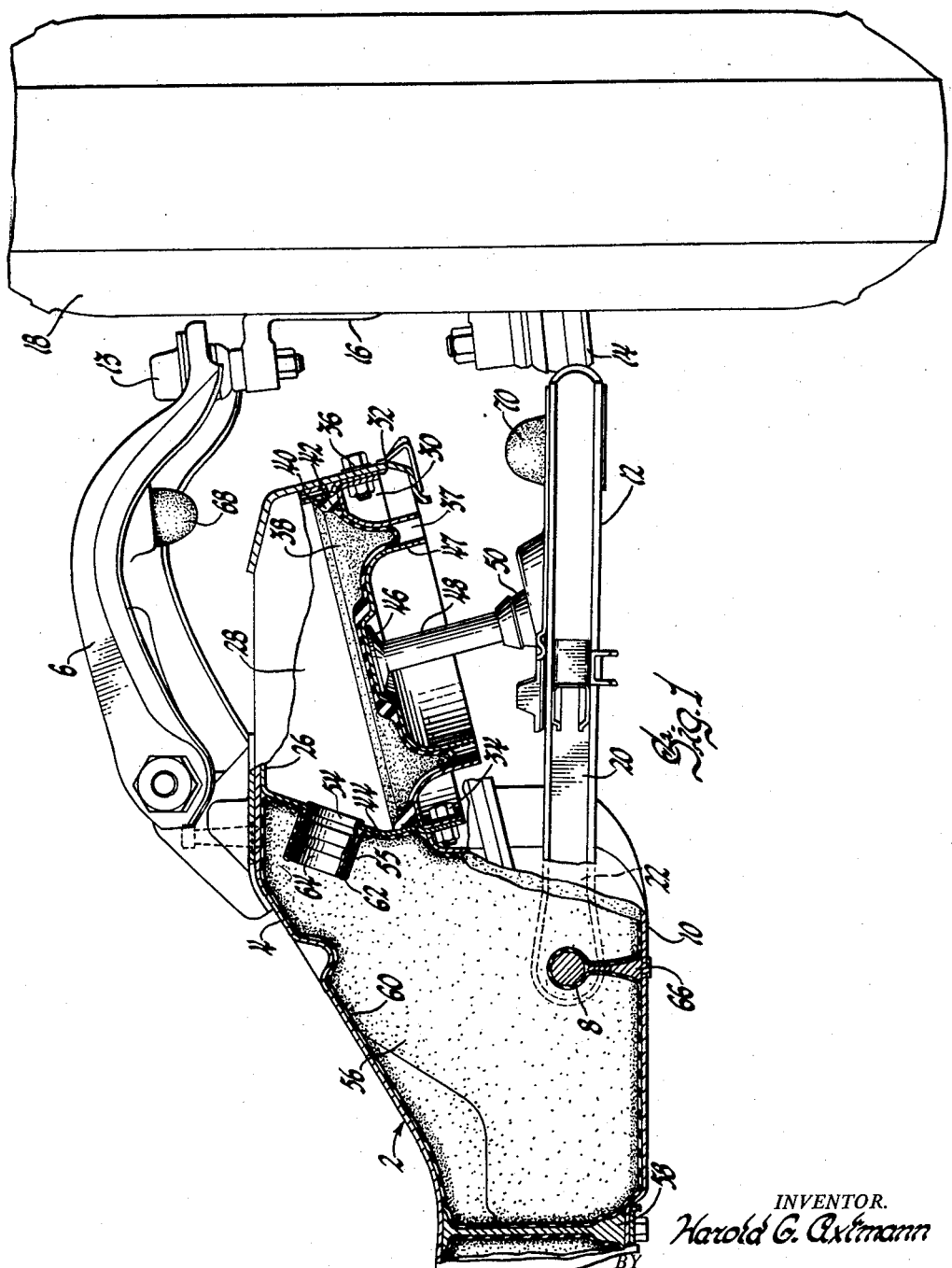

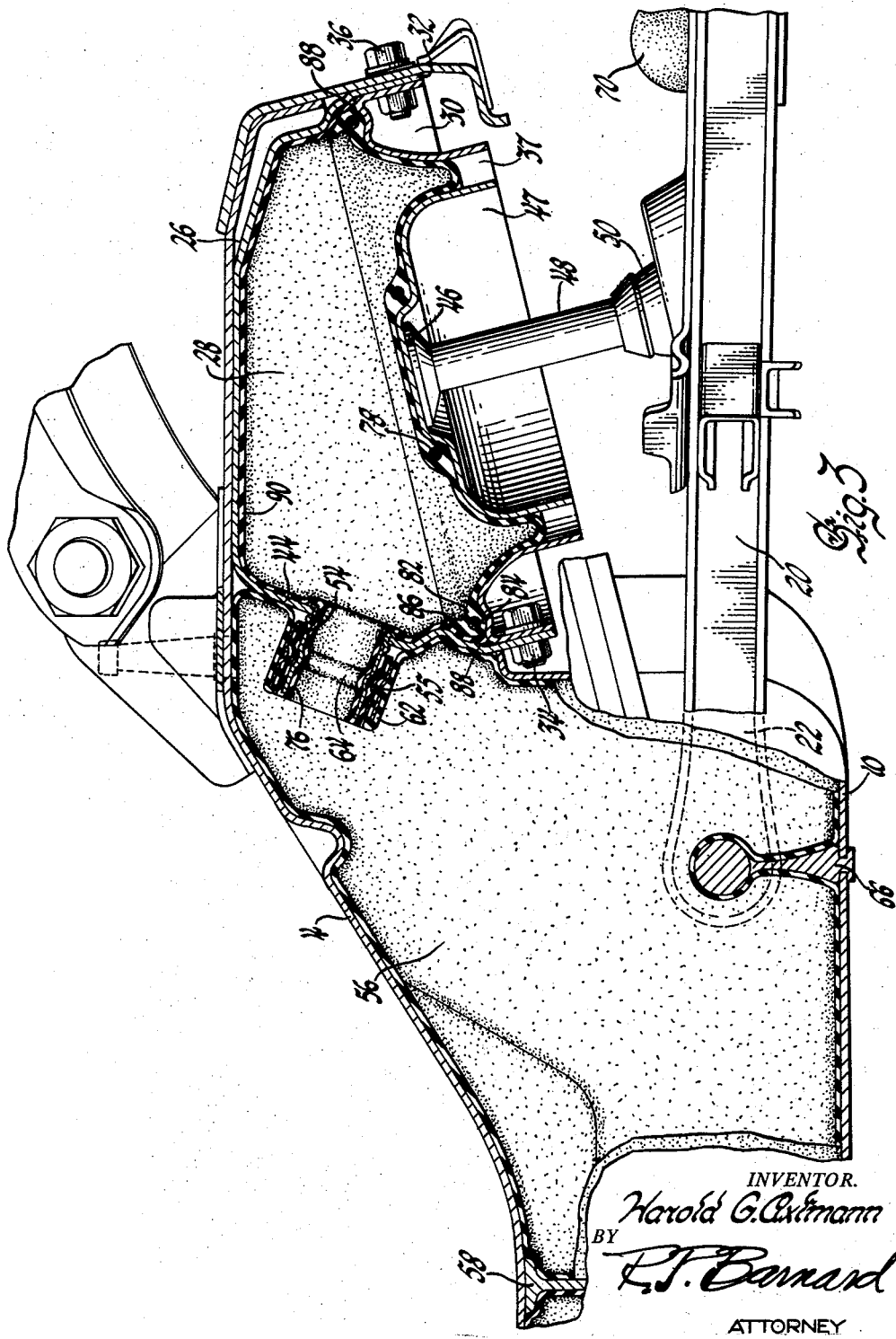

United States Patent Office 2,917,319
Patented Dec. 15, 1959

2,917,319

PLURAL COMPARTMENT FLUID SUSPENSION FOR VEHICLES

Harold G. Axtmann, Lansing, Mich., assignor to General Motors Corporation, Detroit, Mich., a corporation of Delaware Application November 19, 1956, Serial No. 623,083

11 Claims. (Cl. 280—124)

The present invention relates to a fluid suspension interconnecting a vehicle frame and the supporting means of the latter to transmit load and control the relative movement therebetween. More particularly, this invention is directed to fluid suspension mechanisms in which a hollow vehicle frame member forms one component part of the vehicle spring unit and is an improvement in the suspension mechanism as disclosed in the copending application of V. D. Polhemus and Max Ruegg, S.N. 623,103, filed November 19, 1956.

In recent years, improvements in suspensions to improve the riding characteristics of automobiles have been achieved by a better understanding of the phenomena and characteristics of chassis shake, but these improvements have been made without any appreciable improvements in the vertical riding qualities of the cars. To improve the vertical riding qualities of the cars, the frequency of vertical ride motion must be slowed down and, to do this, the static deflections of suspensions must be increased, which can only be accomplished for any given car by reducing the spring rates. With steel springs it is not feasible to lower the spring rates much beyond the point where they are today for to do so would cause an increasing variation between the loaded and unloaded standing height of the car frame relative to its supporting wheels.

Thus, for some time it has been apparent that a new suspension medium has been needed which could maintain a car at a substantially constant static standing height for any variation in car load. The use of air as a suspending medium is considered to be the best approach to the problem because air is the cheapest, lightest, and most readily available medium that will accomplish the results desired, although other fluids may be employed. In using air springs, enough air may be conveniently contained in a primary air chamber, in which air is compressed due to relative oscillation of the vehicle frame and its supporting wheels, to provide spring rates equal to those used on today's production cars employing conventional steel coil springs. In addition, however, extra chambers may be utilized for the expansion of air from the primary chamber as air is compressed therein, thereby providing lower spring rates to further improve riding qualities of the vehicle.

The need for additional air chambers for lowering spring rates results in a need for space in the vehicle construction for these chambers. The aforementioned copending application discloses a construction utilizing hollow structural vehicle frame members to provide the needed air chambers, thereby avoiding the construction of a spring unit of inordinate height which would project through the floor of the vehicle into the passenger or rear package compartments. In utilizing the conventional frame members of the vehicle chassis, a problem arises with respect to properly sealing the various air chambers formed within such hollow frame member. Within the scope of this invention, the various air chambers formed within such a hollow frame member may be easily and effectively sealed to make the air chambers leakproof by flexible rubber bladders encased within the hollow vehicle frame member to enclose either the primary air spring chamber or other expansion chambers or both.

In addition, sealing bladders mounted within a hollow frame member in accordance with this invention may be integral with a flexible diaphragm which forms the movable wall of the primary air chamber and which is acted upon by the usual piston adapted for reciprocation relative to the primary air chamber to transmit loading between a vehicle frame and its wheeled supporting means.

These and other advantages of this invention will become more apparent as the description proceeds, reference being made therein to the accompanying drawings, in which like numerals refer to like parts, and in which:

Figure 1 is a vertical cross sectional view of a vehicle front suspension equipped with one form of this invention;

Figure 2 is a vertical cross sectional view of a front suspension equipped with another embodiment of the subject invention; and Figure 3 is still another embodiment of this invention shown in vertical cross section.

Referring now to the drawings and particularly to Figure 1, there is shown a hollow vehicle frame cross member 2 to the upper wall 4 of which there is suitably secured for pivotal movement an upper control arm 6. A shaft 8 extends longitudinally through the hollow cross member near its lower wall 10. A lower control arm 12 is pivotally supported on the shaft 8, the outboard ends 13 and 14 of the upper and lower control arms being secured in the usual manner to a knuckle 16 operatively connected to a vehicle wheel 18. The upper and lower control arms may be of the usual wishbone configuration, the two arms 20, 22 of the lower wishbone being connected to the shaft 8 on either side of the side walls of the hollow frame member 2. In all the figures the arm 20 of the lower wishbone has been broken away to clearly show the inner construction of the hollow cross member. The lower wall of the hollow cross member has an opening near its outboard end for receiving an air spring housing 26 which encloses a primary air spring chamber 28. A diaphragm retainer 30 is suitably secured to a depending flange or skirt 32 of the air spring housing by means of bolts 34, some of which may extend through the walls of the hollow cross member as at 36 to demountably secure the housing and diaphragm retainer within the hollow cross member. The retainer has a depending cylindrical skirt portion 37 radially spaced from the skirt 47 of piston 46.

A flexible diaphragm 38 of rubber or other elastomer suitably reinforced by such as nylon cords has an outer annular peripheral bead 40 suitably seated on a radially inwardly extending shoulder 42 of the diaphragm retainer and against the side wall 44 of the spring housing. The outer peripheral bead of the diaphragm may be sealed in this position by the force of the air under pressure in the primary air reservoir as is disclosed in the copending application of Von D. Polhemus, Serial No. 575,120, filed March 30, 1956.

The flexible diaphragm is of integral construction and forms a movable wall for the primary air chamber and is adapted for reciprocable movement relative thereto in response to movement of piston 46 having a connecting rod 48 operatively connected by a suitable ball and socket joint 50 to the lower wishbone control arm.

The primary air spring housing has an aperture in its sidewall 44 through which the cylindrical sleeve 54 projects into another portion of the hollow cross frame member. This portion of the hollow cross frame member forms a secondary air reservoir or expansion chamber 56 enclosed by the walls of the cross member, the primary air reservoir housing and a structural member 58 secured within the hollow member inboard of the primary air spring unit. An integral flexible bladder 60 has neck portion 62 folded within itself and telescoped about the external surface of the sleeve 54 within the secondary air chamber. Tape or other suitable means 55 maintains the neck of the bladder in firm engagement with the sleeve 54, radial indentations 64 being provided in the surface of the sleeve to prevent the neck of the bladder from telescoping out of engagement with the sleeve. This flexible bladder lies along the structural walls enclosing the secondary air chamber and, as will be noted, encases the shaft 8 and a tapered baffle plate 66 lying beneath the pivot shaft to prevent tearing of the bladder. Although the pressure of the air contained in the secondary air chamber will maintain the bladder in engagement with the walls enclosing said chamber, the bladder may be cemented to such walls if desired.

In operation, relative movement between the vehicle frame and its cross member relative to its supporting means, embodied by the supporting wheels and the upper and lower wishbone control arms, will cause the piston and flexible diaphragm to reciprocate within the primary air chamber thereby compressing the air contained therein. The air so compressed may expand through the sleeve 54 into the secondary air or expansion chamber 56 thereby providing a low spring rate and a soft ride. Rubber bumpers 68 and 70 are mounted, respectively, on the upper and lower wishbone control arms so as to engage the cross member upon the latter moving to too great an extent relative to the supporting means.

In Figure 2 there is shown another embodiment of this invention which comprises a flexible diaphragm 72 overlying the reciprocable piston and formed integral with a bladder portion 74 enclosing the primary air spring chamber 28. The secondary air reservoir 56 is also encased as before by a flexible bladder 60. Cylindrical sleeve 54 establishes fluid communication between the respective chambers, the neck 76 of the primary air chamber bladder being folded and telescoped within and about the sleeve while the neck 62 of the secondary air reservoir enclosing bladder is folded back within itself, tape or other suitable means 55 being enclosed within the folds of the neck to cause firm engagement between the respective bladder necks to maintain them in position with respect to the sleeve 54. It will be noted that metal rings are encased within the inner and outer peripheral beads 78 and 80 to further reinforce the flexible diaphragm portion of the primary bladder and to aid in firmly seating these beads relative to the primary air spring housing and the piston reciprocable therein.

Referring now to Figure 3, there is disclosed a modification of the construction shown in Figure 2 in which the primary air chamber bladder is not integral with the flexible diaphragm forming a movable wall thereof. In this construction, the outer peripheral annular bead 82 of the flexible diaphragm is seated in an annular depression 84 formed on the annular shoulder of the diaphragm retainer 30. The peripheral bead 82 of the flexible diaphragm is formed with a lip 86 which together with the body of the bead engages the edge 88 of the primary air chamber enclosing bladder 90 to seal the latter against the wall of the air spring housing 26. As described in Figure 2, a sleeve establishes communication between the primary and secondary air chambers and the necks of the respective chamber enclosing bladders are secured to this sleeve.

It will now be clear that the utilization of the bladder construction disclosed by this invention will render air tight the various air chambers which are formed within a hollow cross member of a vehicle frame thereby insuring proper functioning of the air spring. The primary air spring of the embodiments aforedescribed have been disclosed as being of the demountable type. It will, however, be apparent that the walls of the cross member themselves may perform the function of the primary air spring housing in which case the flexible bladders of this invention will be employed to secure such chamber against leakage. In a demountable type of assembly as herein disclosed, it may be possible to control the manufacturing processes so closely as to make a spring housing, such as the housing 26, an air tight structure. In such a case a sealing bladder may not be required. However, even in this case, the flexible bladder will preclude leaks from occurring through subsequent use of the vehicle.

I claim:

1. Fluid suspension means for a vehicle having a frame and supporting means operatively connected thereto, said suspension means comprising a hollow frame member having an opening in one wall thereof, a fluid spring housing supported within said hollow frame member through the open end thereof, said housing enclosing a primary fluid spring chamber and forming with the walls of said hollow frame member a secondary fluid chamber, a flexible diaphragm forming a movable wall of said primary chamber, a piston operatively connected to said supporting means and engaging said diaphragm to transmit loading between said frame and supporting means, an opening in the wall of said housing establishing fluid communication between said chambers, a flexible bladder lying against the walls of said hollow frame member and the wall of said housing enclosing said secondary air chamber, said bladder having a neck sealingly seated on the opening in said housing establishing sealed fluid communication between said chambers.

2. Fluid suspension means for a vehicle having frame and supporting means operatively connected thereto, said suspension means comprising a hollow frame member enclosing a fluid containing chamber and having an opening in one wall thereof, a housing demountably supported within said hollow frame member through the open end thereof, a flexible diaphragm forming a movable wall of said housing, a piston operatively connected to said supporting means and engaging said diaphragm to transmit loading between said frame and supporting means, an opening in the wall of said housing establishing fluid communication between a primary fluid chamber within the latter and a secondary fluid chamber formed within said hollow frame member exteriorly of said housing, a cylindrical sleeve mounted within said opening and extending into said secondary fluid chamber, a flexible bladder lying against the walls of said hollow frame member to enclose said secondary air chamber, said bladder having a neck telescoped about said sleeve to seal said secondary fluid chamber.

3. Fluid suspension means for a vehicle having laterally spaced longitudinally extending frame members transversely interconnected by a hollow cross member, vertically spaced control arms operatively connected to supporting wheels at their one end and pivotally connected to said hollow cross member at their other ends, the lower of said control arms being pivotally connected to a shaft extending through said hollow cross member, said hollow frame member enclosing a fluid containing chamber and having an opening in the lower wall thereof between said spaced control arms, a housing demountably supported within said hollow frame member through the opening thereof and enclosing a primary fluid spring chamber, a flexible diaphragm forming a movable wall of said chamber, a piston engaging said diaphragm and having a connecting rod operatively connected to the lower of said control arms intermediate its length to transmit loading between said cross member and said lower control arm, an opening in the wall of said housing establishing fluid communication between the primary chamber and the hollow cross member, a cylindrical sleeve extending through said opening into said hollow frame member exteriorly of said housing, an integral flexible bladder lying against the walls of said hollow frame member and the shaft extending therethrough to sealingly enclose a secondary fluid chamber, said bladder having a neck telescoped about said sleeve to establish sealed communication between said chambers.

4. The combination as defined in claim 3 which further includes a longitudinally extending tapered baffle plate secured to the lower wall of said hollow frame member and terminating beneath the outer surface of said lower control arm supporting shaft, said integral flexible bladder lying about said shaft and against the outer faces of said baffle.

5. Fluid suspension means for a vehicle having a frame and supporting means operatively connected thereto, said suspension means comprising a hollow fluid containing frame member having an opening in one wall thereof, a fluid housing supported within said hollow frame member through the opening therein, an integral bladder lying along the walls of said housing and enclosing therewithin a primary fluid spring chamber, a portion of said bladder forming a movable wall of said chamber, a piston operatively connected to said supporting means and engaging said movable wall to transmit loading between said frame and supporting means, an opening in the wall of said housing for fluid communication between said primary spring chamber and a secondary spring chamber formed exteriorly of said housing within said hollow frame member, a flexible bladder lying along the walls of said hollow frame member exteriorly of said housing and enclosing said secondary spring chamber, the bladders of said primary and said secondary spring chambers having necks telescoped within each other through said housing opening.

6. Fluid suspension means for a vehicle having a frame and supporting means operatively connected thereto, said suspension means comprising a hollow fluid containing frame member having an opening in one wall thereof, a fluid housing supported within said hollow frame member through the opening therein, an integral bladder lying along the walls of said housing and enclosing therewithin a primary fluid spring chamber, a portion of said bladder forming a movable wall of said chamber, a piston operatively connected to said supporting means and engaging said movable wall to transmit loading between said frame and supporting means, an opening in the wall of said housing for fluid communication between said primary chamber and a secondary fluid spring chamber formed exteriorly of said housing within said hollow frame member, a flexible bladder lying along the walls of said hollow frame member exteriorly of said housing and enclosing said secondary chamber, a cylindrical sleeve extending through said housing opening into said secondary chamber, the bladders enclosing said primary and secondary chambers having necks telescoped about said cylindrical sleeve.

7. Fluid suspension means for a vehicle having a frame and supporting means operatively connected thereto, said suspension means comprising a hollow fluid containing frame member having an opening in one wall thereof, a fluid housing demountably supported within said hollow frame member through the opening therein, an integral bladder lying along the walls of said housing and enclosing therewithin a primary fluid spring chamber, a portion of said bladder forming a movable wall of said chamber, a piston operatively connected to said supporting means and engaging said movable wall to transmit loading between said frame and supporting means, an opening in the wall of said housing for fluid communication between said primary chamber and a secondary fluid spring chamber formed exteriorly of said housing within said hollow frame member, a flexible bladder lying along the walls of said hollow frame member exteriorly of said housing and enclosing said secondary chamber, a cylindrical sleeve extending through said housing opening into said secondary chamber, a neck on said primary chamber bladder extending through said opening and sleeve and telescoped back about said sleeve, and a neck on said secondary chamber bladder telescoped about said sleeve and said neck of the primary chamber bladder.

8. Fluid suspension means for a vehicle having a frame and supporting means operatively connected thereto, said suspension means comprising a hollow frame member enclosing a fluid containing chamber and having an opening in one wall thereof, a fluid spring housing supported within said hollow frame member through the opening therein, a flexible diaphragm forming a movable wall of said housing, a piston operatively connected to said supporting means and engaging said diaphragm to transmit loading between said frame and supporting means, an opening in the wall of said housing establishing fluid communication between the latter and said fluid containing chamber formed within said hollow frame member exteriorly of said housing, a flexible bladder lying within said hollow frame member and enclosing the fluid contained therewithin, a flexible bladder lying within said housing and sealingly engaging said flexible diaphragm to sealingly enclose fluid therebetween, said bladders having neck portions telescoped relative to each other at said housing opening.

9. Fluid suspension means for a vehicle having a frame and supporting means operatively connected thereto, said suspension means comprising a hollow frame member enclosing a fluid containing chamber and having an opening in one wall thereof, a fluid spring housing supported within said hollow frame member through the open end thereof, a flexible diaphragm forming a movable wall of said housing, a piston operatively connected to said supporting means and engaging said diaphragm to transmit loading between said frame and supporting means, an opening in the wall of said housing establishing fluid communication between the latter and said fluid containing chamber formed within said hollow frame member exteriorly of said housing, a flexible bladder lying within said hollow frame member and enclosing the fluid contained therein, a flexible bladder lying within said housing and sealingly engaging said flexible diaphragm to sealingly enclose fluid therebetween, a cylindrical sleeve extending through said housing opening into said fluid containing chamber within said hollow frame member, said flexible bladders having neck portions telescoped about said sleeve to seal communication between said chambers.

10. Fluid suspension means for a vehicle having a frame and supporting means operatively connected thereto, said suspension means comprising a hollow frame member enclosing a fluid containing chamber and having an opening in one wall thereof, a fluid spring housing demountably supported within said hollow frame member through the opening therein, a flexible diaphragm forming a movable wall of said housing, said diaphragm having a peripheral bead sealingly seated on said housing, a piston operatively connected to said supporting means and engaging said diaphragm to transmit loading between said frame and supporting means, an opening in the wall of said housing establishing fluid communication between the latter and the fluid containing chamber formed within said hollow frame member exteriorly of said housing, a flexible bladder lying within said hollow frame member and enclosing the fluid contained therein, a flexible bladder lying within said housing and sealingly engaged by the peripheral bead of said flexible diaphragm to sealingly enclose fluid therebetween, a cylindrical sleeve extending through said housing opening into said fluid containing chamber enclosed by said hollow frame member, a neck on said housing bladder extending through said sleeve and telescoped about the external surface of the latter, the neck of said hollow frame member bladder being telescoped about said cylindrical sleeve and housing bladder neck.

11. The suspension mechanism as defined in claim 10 in which said cylindrical sleeve includes a radial indentation conformed to by the necks of said bladders, and means engaging the telescoped neck of said hollow frame member bladder to secure the latter to the telescoped neck of said housing bladder and cylindrical sleeve.

References Cited in the file of this patent

UNITED STATES PATENTS

| | | |
|---|---|---|
| 850,180 | Podstata | Apr. 16, 1907 |
| 1,242,431 | Foster | Oct. 9, 1917 |
| 1,538,420 | Church | May 19, 1925 |
| 2,115,072 | Hunt | Apr. 26, 1938 |
| 2,257,913 | Maranville | Oct. 7, 1941 |